United States Patent [19]
Affeldt et al.

[11] Patent Number: 5,620,519
[45] Date of Patent: Apr. 15, 1997

[54] CONTROLLER AND METHOD FOR SELECTIVELY CONTROLLING THE AMOUNT OF WAX APPLIED TO FRUIT

[75] Inventors: Henry A. Affeldt, Victorville; Tim D. Conway, Stockton; David M. Musoke, Alta Loma, all of Calif.

[73] Assignee: Sunkist Growers, Inc., Ontario, Calif.

[21] Appl. No.: 292,898

[22] Filed: Aug. 19, 1994

[51] Int. Cl.⁶ .................................................. B05C 11/00
[52] U.S. Cl. ........................ 118/669; 118/676; 118/679; 427/8
[58] Field of Search ..................................... 118/668, 669, 118/676, 679, 680, 681, 682, 683, 712, 713; 356/379; 427/8; 426/302

[56] References Cited

U.S. PATENT DOCUMENTS

| | | | |
|---|---|---|---|
| 4,421,800 | 12/1983 | Schoenberg et al. | 118/680 |
| 4,477,483 | 10/1984 | Lewis | 118/676 |
| 4,693,378 | 9/1987 | Azegami | 356/379 |
| 4,941,182 | 7/1990 | Patel | 118/697 |

*Primary Examiner*—Donald E. Czaja
*Assistant Examiner*—Calvin Padgett

[57] ABSTRACT

Application of wax to fruit, or groups of fruit in a conveyor system, can be controlled to optimize the protective and cosmetic effects of the wax application and to efficiently utilize the wax notwithstanding variations in size, texture, nature or number of the fruit, the type(s) of wax or the processing environment, by providing an intelligent wax controller. The wax controller has a camera which detects fruit passing through a field of view defined by an optical housing in which the camera is fixed. Particularly if the camera is a line-scan camera, two-dimensional pixel maps of the fruit passing through the viewing area are assembled and image processed to provide distinct pixel images even when the fruit are touching. The entire width of the conveyor belt is detected furing each detection time. The diameter of the fruit for each of the separated images is then determined, from which the total surface area of the fruit passing under the viewing area is computed. Based on this computation a plurality of variable stroke pujps and wax nozzles are each individually controlled at appropriate positions across the width of the conveyor system to apply the appropriate amount of wax to the fruit then passing under the wax applicator nozzles.

39 Claims, 6 Drawing Sheets

CONTROLLER AND METHOD FOR SELECTIVELY CONTROLLING THE AMOUNT OF WAX APPLIED TO FRUIT

BACKGROUND OF THE INVENTION

1. Field of the Invention

The invention relates to apparatus and methods for applying wax or another substance to the surfaces of objects, and more particularly to the application of wax to citrus fruit on a conveyor system.

2. Description of the Prior Art

It is a well established procedure in the processing and sorting of fruit, and, in particular citrus fruit, to finish the fruit by applying a protective, preservative and cosmetically enhancing surface layer of wax or other material. Typically, the wax is applied to objects, or specifically to fruit, in a conveyor line by spraying a liquid wax onto the fruit as it is rotated on a brush bed conveyor and advanced to a packaging station.

However, applying the appropriate amount of wax to each run of fruit is often difficult to control if optimal results and efficient use of the wax is to be achieved. The optimum amount of wax varies according to the fruit size and variety of fruit to which the wax is applied, and also, to some extent, varies seasonally. The wax volume which must be sprayed onto the fruit also varies according to the speed of the fruit through the waxer. The efficiency of the wax application varies according to the distribution of fruit on the conveyor bed in the waxer and in particular with respect to the lateral distribution of the fruit as it travels underneath the spray nozzles. Further non-uniformity of wax application is experienced when the conveyor line, for any number of reasons, may be stopped.

The amount of wax which must be applied to the fruit varies according to the type of wax which is used. Fruit in the center of the waxer tends to move through the waxer faster than fruit on the sides, which also results in an uneven wax application. Changing the wax nozzles to accommodate this type of variation is often impractical. The droplet size distribution of the wax sprayed onto the fruit for a given nozzle is typically constant and it is difficult to vary the amount of wax applied to the fruit without changing nozzles. Still further, the quality and nature of the wax application will vary with the amount of brush wear in the underlying brush bed and also whether the brush bed was pre-loaded with wax prior to the fruit flow. Finally, the quality of the resulting wax application still further varies with the skin texture of the fruit.

All of these variables with respect to applying the wax to the fruit make it extremely difficult to obtain an efficient use of the wax and/or a high shine, uniform fruit pack-out. Therefore, what is needed is some type of apparatus and method in which each of these variables may be adjusted in order to provide both cost effective and efficient wax usage, high uniform wax applications and hence uniform shine in the fruit pack-out.

BRIEF SUMMARY OF THE INVENTION

The invention is an apparatus for applying a substance, such as wax, to the surface of objects, such as citrus fruit, carried on a conveyor system. The substance is applied according to a plurality of parameters including the quantity and surface area of the objects. The apparatus comprises a photometric assembly for measuring multiple geometric features of each of the objects on the conveyor system. A control circuit is coupled to the photometric assembly and generates a command to dispose a predetermined amount of the substance on each of the objects, or a predetermined application density on a plurality of the objects, in accordance with the measured geometric features. As a result, the substance is efficiently and uniformly applied to each of the objects, or to the plurality of objects, notwithstanding size and quantity variations in the objects.

The photometric assembly comprises a camera system for generating a scan line image of the objects along a predetermined line across the conveyor system. The control circuit comprises a computer system for receiving from the photometric assembly a signal corresponding to the measured geometric features. The computer system computes the area of surface of each of the objects and generates a corresponding command signal for controlling application of the substance to the objects.

In the illustrated embodiment, the computer system correlates a magnitude for the measured geometric feature with one of the scanned line images corresponding to each of the objects on the conveyor system.

The apparatus further comprises a plurality of applicator subsystems, each of which are individually controllable by the control circuit. Each applicator subsystem applies the substance to the objects on the conveyor system. Each applicator subsystem is comprised of an applicator for disposing the substance on the objects, such as a spinning disk nozzle and a corresponding variable pump for supplying the substance to the applicator. The control circuit independently provides commands to each of the pumps to provide a corresponding selective amount of the substance to any selective one(s) of the objects on the conveyor system.

The photometric assembly detects each object at a predetermined viewing position on the conveyor system and provides a plurality of pixel line scans of that object for a corresponding plurality of scan times. The photometric assembly comprises a memory circuit for assembling the plurality of line scans into a pixel map of that object. The photometric assembly processes the pixel map of each of the objects passing through the viewing area on the conveyor system to provide a distinct and separated pixel map for each of them. In the illustrated embodiment, the photometric assembly generates the distinct and separate pixel map of each of the objects passing through the viewing area on the conveyor system by subjecting the pixel map to a Sobel filter.

The control circuit generates a maximal scan line width for the distinct and separate pixel map corresponding to each of the objects passing through the viewing area on the conveyor system. The control circuit generates a corresponding fruit surface area for each such objects based on the maximal scan line width according to an assumed geometric configuration and orientation of that object in the viewing area on the conveyor system, together with a calculation of the number of such objects being viewed. The control circuit generates a command signal corresponding to volume of the substance to be applied to the objects according to the computed surface area, the number of objects and at least one other user input parameter corresponding to each object.

More particularly the invention, in its principal embodiment, is characterized as an "intelligent" wax controller for coating fruit with wax in a conveyor system comprising a line scan camera, and a housing for supporting and orienting the camera with respect to the conveyor system and for defining an optical field of view. A memory circuit is coupled to the line scan camera for assembling a pixel map of video images of each of the objects on the conveyor system passing through the field of view. A computer circuit separately detects each of the images of the fruit passing through the field of view. The computer circuit determines a geometric feature of each of the separately detected images and generates a command signal for each of the fruit, or for each instantaneous array of fruit, corresponding to the images according to the geometric feature associated therewith. At least one variable wax applicator disposes wax on the fruit according to the command signal generated by the computer circuit associated with each of the fruit passing through the field of view on the conveyor system. As a result, wax is efficiently and optimally applied to that particular fruit or to that particular array of fruit.

The wax controller may further comprise a plurality of wax applicators. In that case, each wax applicator is independently controlled by the computer circuit to apply variable amounts of wax to corresponding ones of the fruit passing through the field of view of the conveyor system.

The computer circuit is user-adjustable to vary detection and fruit image separation thresholds corresponding to the pixel map of the images of the fruit within the viewing area of the conveyor system.

The invention is also a method of controlling the application of a coating to a plurality of objects on a conveyor system according to variable parameters associated with each of the objects, comprising the steps of detecting each of the objects within a viewing area on the conveyor system, forming a separate and distinct pixel image of each of the objects passing through the viewing area of the conveyor system, extracting a geometric feature from each of the separate and distinct pixel images of each of the objects and the number of the objects being detected, and applying the substance to the objects according to the extracted geometric feature for each of the objects and their number. As a result, efficiency and uniformity of application of the substance to the objects is improved.

The step of forming a separate and distinct pixel image of the objects comprises the step of forming a pixel image of the objects distinct from a conveyor background. The step of forming further comprises the step of separating images of each of the objects in the event that the objects are physically touching to form disconnected pixel images of each of the objects passing through the viewing area of the conveyor system.

The step of extracting a geometric feature from each of the object comprises the step of measuring a diameter of each of the objects from the separated pixel images thereof. The step of extracting the geometric feature further comprises the step of computing a total surface area of each of the objects corresponding to the extracted diameter. The step of applying the substance to the objects comprises the step of generating an application command signal of variable magnitude or frequency according the computed surface areas of each of the objects to command a substance applying apparatus to operate instantaneously at a computed intensity (i.e., volume of substance directed to a total surface area per unit time—e.g., cubic centimeters per second per square centimeter of total surface) and to thus dispose the substance on the objects according to the computed surface area per unit time (e.g., square centimeters per second).

In the illustrated embodiment, the step of forming a separate and distinct pixel image of each of the object is comprised of the steps of line scanning each of the objects and assembling a plurality of the line scans to form a pixel array map of each of the objects. The step of forming a separate distinct pixel image of each of the objects comprises the step of spatially filtering the pixel image to separate images of adjacent objects which may be touching.

The invention may be better visualized by now turning to the following drawings wherein like elements are referenced by like numerals.

The invention and its various embodiments may now be better understood by turning to the following detailed description.

DETAILED DESCRIPTION OF THE PREFERRED EMBODIMENTS

In its preferred embodiment, the fruit waxer described in connection with the above listed figures is an intelligent wax controller system using a high precision non-contact wax control system that is comprised of a camera, a personal computer-based electronic controller box, and a variable rate pumping system. The operator uses a graphic touch screen display to run new or preprogrammed waxing programs. The system, in addition to being sensitive to fruit texture and size in the waxing process, provides for restricted access through a password security code, the ability to use the system in either automatic, manual or brush pre-load modes to independently control a multiplicity of wax pumps, to provide flexible and user-friendly wax plan generation and editing features, to change the fruit processing variables from the operator's touch screen without interrupting system operation, to provide extensive camera calibration test routines. It also provides a screen saver to prevent burn-in or burn-out of the touch screen, and a context sensitive help system.

The hardware of the system is generally comprised of three elements: a camera, a controller box and the pumping system. The camera, in the illustrated embodiment, is a line scan sensor with a wide angle lens to view the entire width of the brush bed conveyor belt. In the illustrated embodiment, the brush bed conveyor belt is 2.15 meters wide. One or two controlled 60 Hertz fluorescent lamps provide illumination of the fruit located on the conveyor belt below.

The controller box contains the touch screen processor board, which, in the illustrated embodiment, is a Cyrix 486 SLC processor, a camera image store card (described below in connection with FIG. 5), a programmable pump control card and several power supplies. The controller has a power on/off switch provided in an accessible location. The programmable pumping system is comprised of a plurality of variable stroke, variable speed pumps, five of which are provided in the illustrated embodiment and which are rated at 100 strokes per minute, each with a nozzle with a spinning disk head rated up to 12,000 rpm, and a programmable counter/timer card that generates a variable frequency pulse to control the pumps. The pumps can also operate without the pulsed signal, if they are switched to their internal setting. At their internal setting, the pumps operate at a fixed stroke rate. If the pumps are switched to their external setting, they will operate at a stroke rate controlled by a variable frequency pulse, the generation of which is described in greater detail below.

The system described below also incorporates software which monitors the input from the line scan camera and touch screen, and controls the pumps accordingly. The camera views the fruit flow and sends data to the image store card in the controller box. The system software then calculates the fruit flow rate. The fruit flow rate is then mapped into a pump store rate according to a linear relationship pre-stored in the system. The relationship is defined as:

$$R = M \cdot (A - X1) + Y1,$$

where

R is the variable pump stroke rate,
$M = (Y2 - Y1)/(X2 - X1)$,
Y1 the minimum pump stroke rate,
Y2 the maximum pump stroke rate,
X1 the minimum fruit flow rate,
X2 the maximum fruit flow rate, and
A the current fruit flow rate.

The variable pump rate is multiplied by factor, K, to determine the final stroke rate, i.e. final stroke rate=K·R. The default rate for the system of K is 1.0, but it can be set by the user to any value, which in the illustrated embodiment is typically between 0.5 and 2.0. The multiplier, K, is the same for all the pumps although it may be selectively assigned to the different pumps if desired. The software sends the final pump stroke rate to the pump control circuitry. When the waxer is running, the current values for fruit flow and pump stroke rates are displayed on the touch screen and the screen is updated every second.

Application of wax to fruit can be individually controlled in a conveyor system to optimize the protective and cosmetic effects of the wax application and to efficiently utilize the wax notwithstanding variations in size, the texture or nature of the fruit, the nature of the wax or the processing environment by providing an intelligent wax controller. The wax controller has a line scan camera which scans fruit passing through a field of view defined by an optical housing in which the line scan camera is fixed. Two-dimensional pixel maps of the fruit passing through the viewing area are assembled and image processed to provide distinct pixel images even when the fruit are touching. The entire width of the conveyor belt is scanned during each scan time. The diameter of the fruit for each of the separated images is then determined, from which the total surface area of the fruit passing under the viewing area is computed.

Based on this computation, a plurality of variable stroke pumps and wax nozzles are each individually controlled at appropriate positions across the width of the conveyor system to apply the appropriate amount of wax to each fruit when passing under the wax applicator nozzles.

The entire system is run through a touch screen, which allows flexible user interaction and alteration so that the wax controller can be operated according to any one of a plurality of pre-stored wax plans or arbitrarily edited and loaded with different wax plans depending upon the fruit then being processed.

It will readily be noted that the apparatus and method of the present invention is herein often described, for simplicity in illustrating the individual elements of the system, in terms of individualized application of wax, or of another substantially liquid substance, to an individual object, such as a citrus fruit.

However, it must be understood that in most cases the amount of the substance to be applied will not be determined, ultimately, on a "one-to-one" (i.e., amount of substance to be applied directly to each object) basis, but rather on the intensity of substance to be directed instantaneously toward a group of objects. This is because the conveyor will generally be a wide carrier which, on a given area of its surface, will normally be carrying a fairly large number of continuous moving objects in a random array. While each object in that array is individually detected by the camera, whose output results in an individual "profile" for each detected object in the array, the application of the substance, downstream, is done simultaneously to all objects in a group of objects, which group approximates the corresponding array detected.

The group to which the substance is applied may not be identical, in composition of objects, with the corresponding array detected, because of random movements of individual objects between the time of detection of the array and the time when the substance is applied. However, for most applications, the assumption may be made that the group of objects subjected to application of the substance is identical to the corresponding array of objects detected, as the objects continuously pass beneath the detection camera and onto the substance application station.

It is, of course, entirely possible for the apparatus of the present invention to cause the substance application means to direct the substance at a subgroup of objects corresponding to objects detected within a defined area of the camera field of view. This would be the case where differences in size might be detected in the sub-arrays, where it would be desirable, and entirely practical, to cause each of the spray devices to direct a different intensity to difference subgroups of objects, each corresponding to one sub-array of detected objects.

Finally, it will be readily understood that the composition of the array of objects being detected, and therefore of the corresponding group of objects to which the substance is to be applied is continuously changing, due to continuous motion of the objects through the system. Accordingly, the system must, and does, instantaneously adjust the instructions sent to the sprayers, based on its continuous detection of the objects passing beneath the camera.

Hardware of the Waxer

Figure 1:
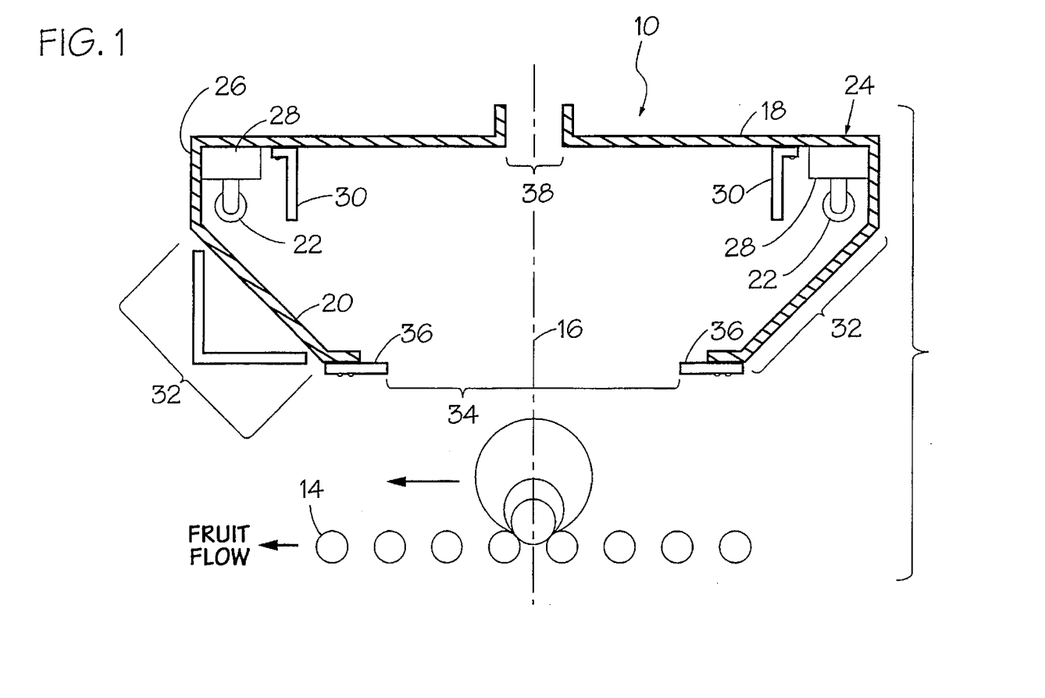
FIG. 1 is a diagrammatic side cross sectional view of a waxer illuminator devised according to the invention.
Figure 8:
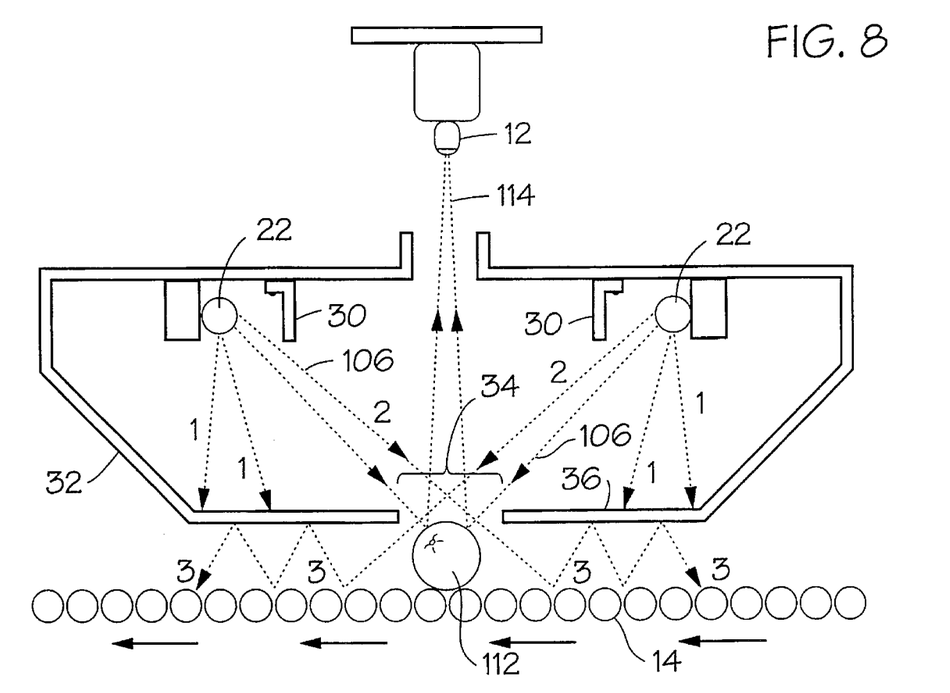
FIG. 8 is a simplified diagram of FIG. 7 illustrating the principal light rays in the waxer illuminator of FIGS. 1–3 when an item of fruit is in a detected position on the brush bed conveyor.
Figure 9:
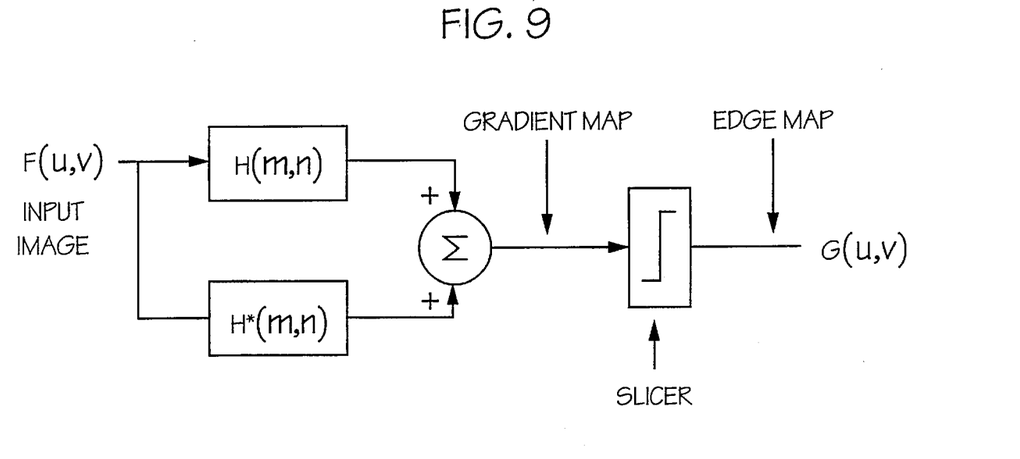
FIG. 9 is a block diagram illustrating the methodology of a Sobel filter by which the images of the fruit are "detouched."

Before considering the operation of the device in greater detail, we consider now the structure of the wax illuminator generally denoted by reference numeral 10 in FIG. 1. Waxer illuminator 10 is shown in FIG. 1 in diagrammatic cross section view. Camera 12, diagrammatically depicted in FIGS. 8 and 9, is not shown in FIG. 1, since it is positioned a predetermined distance well above brush bed 14 to allow camera 12 to view the entire width of brush bed 14. Camera 12 is positioned along a centerline 16 within wax illuminator 10, which centerline 16 is substantially coincident with the centerline of brush bed 14.

A reflector housing 18 is symmetrically disposed around centerline 16 and is typically fabricated from sheet metal to provide a light shroud for the camera view. Interior surface 20 of housing 18 is nonreflective, typically being painted with a flat black paint. One or a pair of 2.44-meter fluorescent lights 22 are disposed along the front edge 24 of housing 18 and along back edge 26. (Fruit flow in conveyor 14 in the illustration of FIG. 1 is from the right to left.) Adjacent each fluorescent light source 22, each of which is provided with its own fixture and ballast 28, is a top light shade 30. Lower portion 32 of housing 18 angles downwardly to define a lower camera slit aperture 34 across the width of brush bed 14. Additional roller shades 36 may be attached to the edges of lower portion 32 to provide an adjustable camera slit 34.

Figure 2:
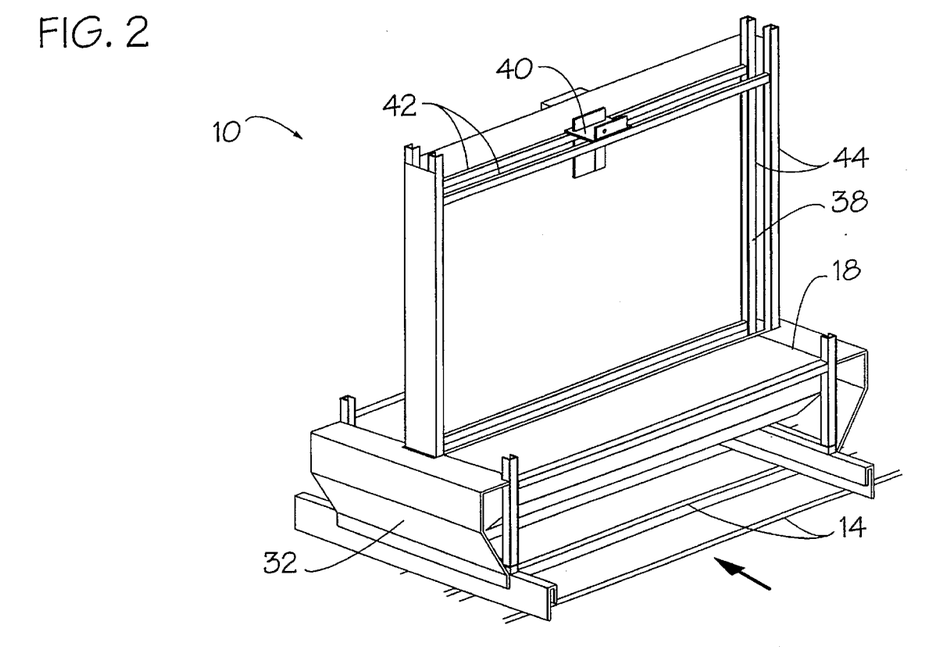
FIG. 2 is a front perspective view of the waxer illuminator assembly of FIG. 1 shown with the front cover plate removed.

FIG. 2 is a perspective front view of wax illuminator 10 shown with the camera removed and shown positioned over brush bed 14. The front panel of waxer illuminator 10 has been removed in order to illustrate upper camera fixture 40 defined above housing 18. Camera 12 is placed within camera fixture 40 connected on cross beams 42, which in turn are connected to a pair of uprights 44 leading down to housing 18. Cross beams 42 and bracket 40 are adjustable to allow precise camera position and angular orientation so that the scan line within the camera can be appropriately aligned to an upper camera slit 38 and lower camera slit 34.

Figure 3:
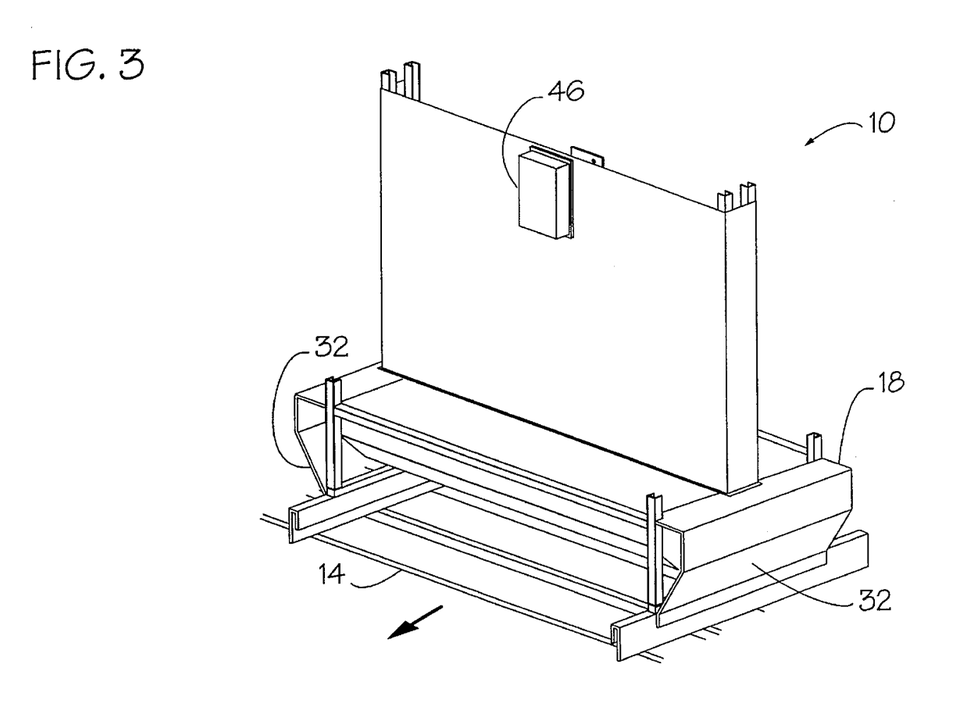
FIG. 3 is a rear perspective view of the waxer illuminator of FIG. 2.

FIG. 3 is a rear perspective view of waxer illuminator 10 illustrating the rear portion of a camera mount 46 which provided to allow for the bulk of the camera while still allowing the camera lens to be centered appropriately over camera slit 38.

Figure 4:
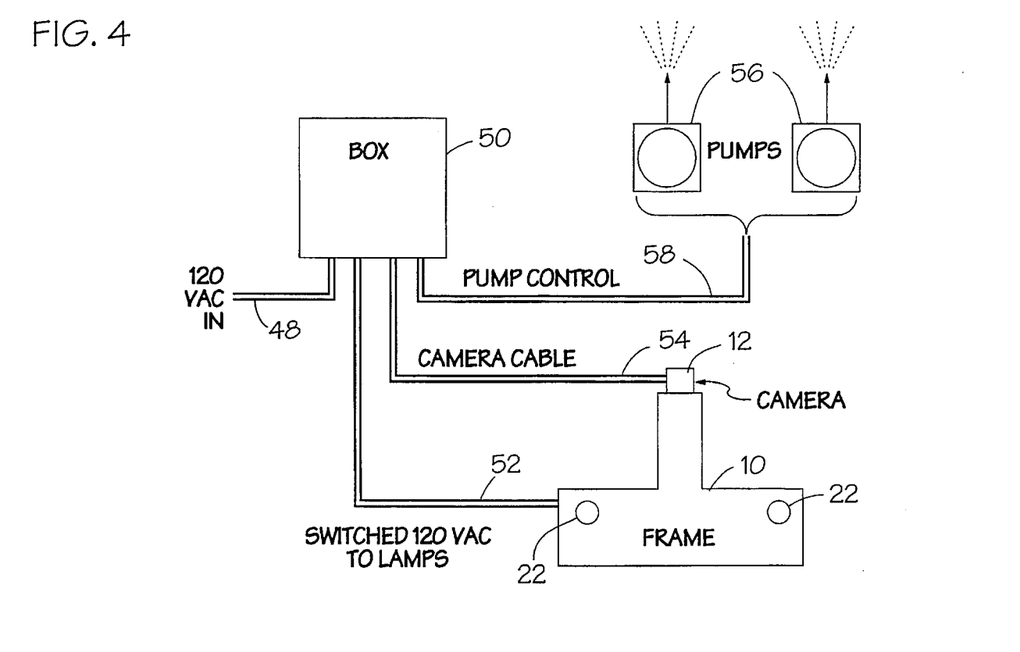
FIG. 4 is a simplified block diagram of the overall electrical circuit of the waxer of FIGS. 1–3.

Before considering how camera 12 is used in connection with waxer illuminator 10 to control the waxing process, we turn first to the schematic of the electrical system and shown in simplified view in FIG. 4. A 120-volt alternating current power line 48 is coupled to electrical connector box 50. Switched 120-volt AC power is supplied to lamps 22 on line 52 from connector box 50. Power is provided to camera 12 within waxer illuminator 10 on a camera power cable 54 from connector box 50. Finally, a plurality of pumps 56, which in the illustrated embodiment comprise five variable speed pumps, are provided with a pump control power signal on line 58 from electrical connector box 50. The connected wax nozzle for one of the pumps is centered over conveyor 14 and four other nozzles coupled to the corresponding four other pumps are symmetrically positioned two on each side of the center nozzle. Thus one pump is referred to as a center pump and the remaining four are referenced as left and right side pumps.

Figure 5:
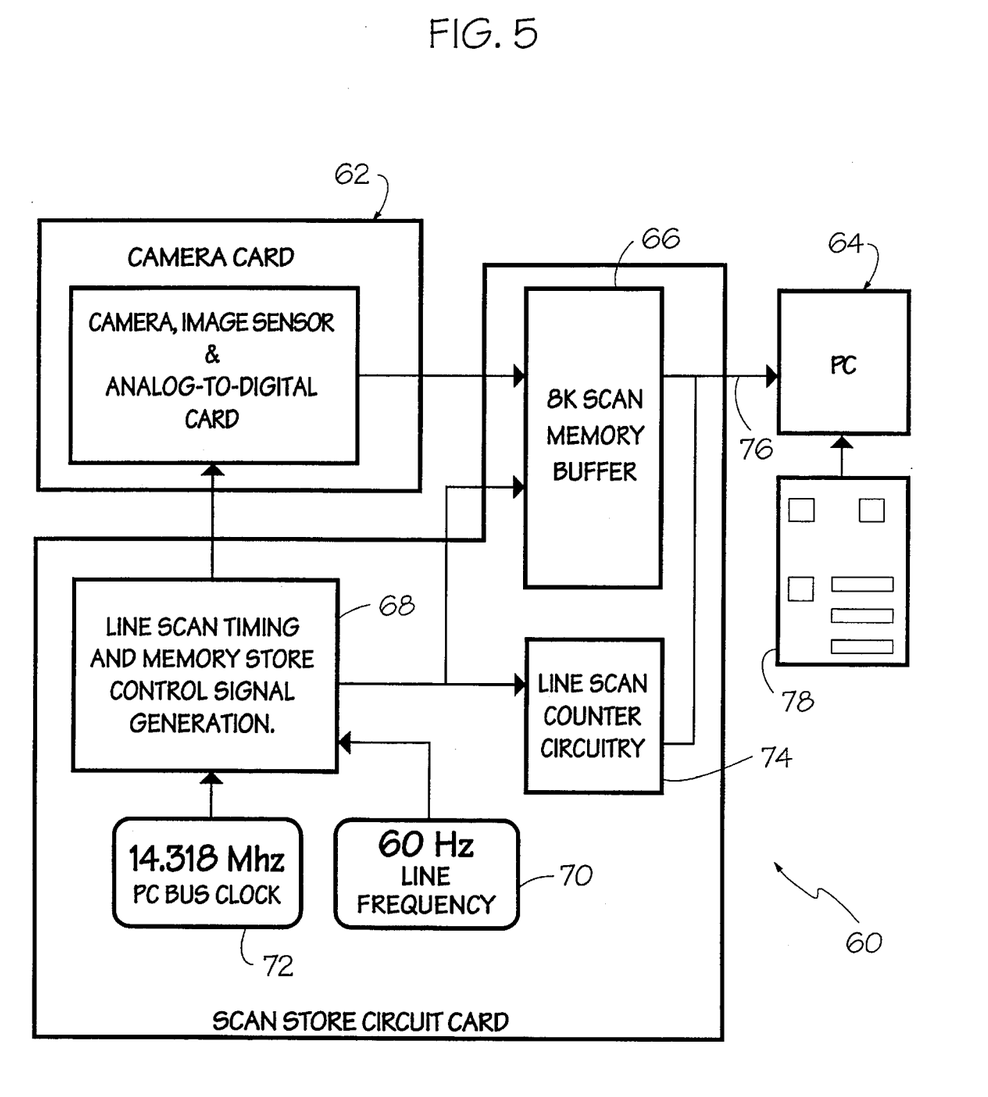
FIG. 5 is a simplified block diagram of a waxer camera and scan store card devised according to the invention.

Contained within controller box 50 is a scan store circuit card, shown in FIG. 5 and generally denoted by reference numeral 60. A camera card generally denoted by reference numeral 62 is disposed in camera housing 46. In the illustrated embodiment, controller 10 varies the rate at which it waxes fruit on conveyor 14 based on information received from line scan camera 12, which is placed approximately two meters above conveyor 14, and the currently running waxing plan previously entered by the user. The waxing plan includes, as an input, the texture of the fruit to be waxed and the minimum and maximum allowable pump and fruit rate values.

The camera in the illustrated embodiment is a 256 pixel line scan sensor with a wide angle lens, which views up to 2.15 meters of the width of brush bed conveyor 14. The scan rate is 30 lines per second, which is synchronized with the frequency of AC power line 48. A personal computer system, generally denoted by reference numeral 64 in FIG. 5, includes a NEMA 12 touch screen processor which is based on a 25 megahertz Cyrix 486 SLC processor.

Camera card 62 is built into the camera housing and is conventional. Camera card 62 has an analog input to allow scanning control and a digital output by which the video information may be downloaded into image store card 60. Image store card 60 is disposed in an ISA slot within personal computer 64. Camera card 62 captures a video image of the fruit on conveyor 14. A serial eight bit analog-to-digital converter in camera card 62 transmits the video data from camera 12 to image store card 60. The image data is transmitted serially to controller box 50 from camera housing 46 to minimize wiring costs. In addition, all signals transmitted to and from camera card 62 are transmitted and received differentially to minimize noise.

Image store card 60 stores the video image from camera card 62. The serialized image data is queued within an eight kilobyte memory chip 66 on image store card 60. Image store card 60 also generates a plurality of timing clock signals, in line scanning timing and memory store control circuit 68, based both upon line frequency derived through line frequency circuit 70 and a 14.31 megahertz bus clock 72 derived from personal computer 64. The timing signals are conventional and are used to capture clean video images, as is dictated by the conventional specifications of camera card 62 in camera 12. The timing signals from circuit 68 are transmitted to camera card 62 via a serial cable.

Image store card 60 also keeps track of each individual scanned line number as it is digitized by camera card 62. The number of the scan line is a useful feature which used later by the software described below to determine when to transfer and process video information from image store card 60 into the memory of personal computer 64.

In order to provide uniform light intensity to the line scan sensor within camera 12, camera card 62 integrates the light from fluorescent lamps 22 over a period of the AC power line cycle. Hence, sampling of each scan of camera card 62 is synchronized with the power frequency on line 48 and therefore with fluorescent lamps 22. The scans are accumulated in a scan counter circuit 74 on image store card 60 and are thus made available along with the scanned image at a data output port 76.

Now it can be understood that the digital video image and scan line number is available on port 76 for the data bus within a conventional personal computer 64 for processing, as will be described in connection with the flow diagrams of FIG. 6. Personal computer 64 monitors the inputs from camera 12, as coupled via camera card 62 and image store card 60 together with the inputs from touch screen 78, to control the variable stroke wax pumps 56 according to the invention. Inputs from touch screen 78 include entering or setting several factors, including a system password, the controller mode (such as manual or automatic modes), fruit texture, the general wax application factor K, a wax plan number, a brush pre-load interval, pump rates, manual mode pump rates, scan capture thresholds, scan processing thresholds and many other inputs which may be used in the implementation of the program.

Operation of Waxer

Figure 6:
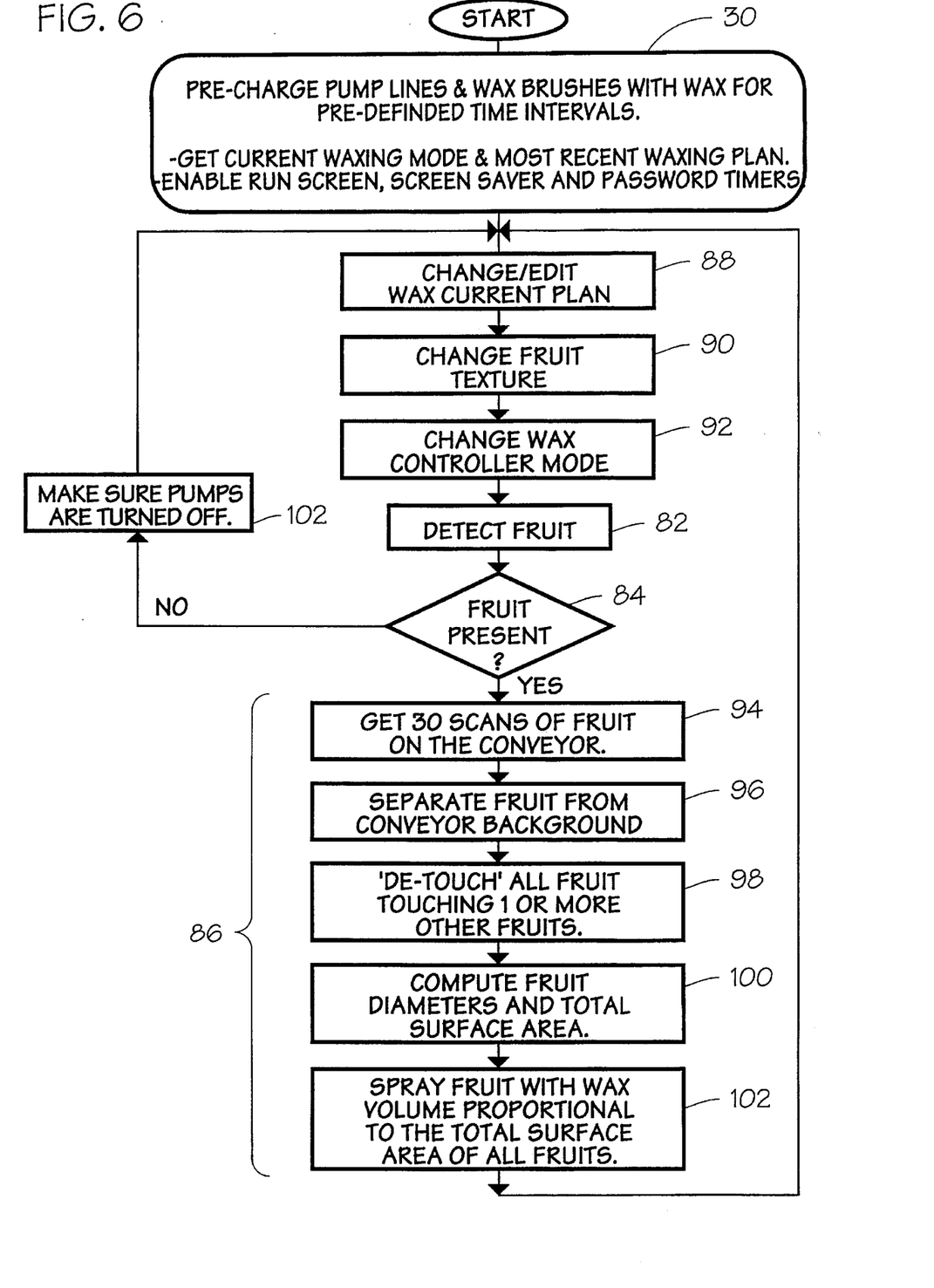
FIG. 6 is a flow diagram illustrating one embodiment of the wax control system by which the circuitry of FIG. 4 controls the waxer illuminator of FIGS. 1–3.

We consider now the operation of the wax controller by turning first to FIG. 6. On power-up, the system goes through a conventional initialization step 80. Initialization includes reading various valid operating parameters from the hard disk within personal computer 64 so that the system will start with the same settings that were previously used. The user may also want to pre-load the roller brushes of conveyor system 14 with wax on a daily or weekly basis before fruit is run through waxer 10. The user then enters the wax pre-load interval in minutes and the pump rates for the center and edge pumps to begin the wax pre-load process. For example, in the illustrated embodiment, five separate pumps 56 are provided, each providing wax to a separate nozzle with a rotating disk. As previously stated one nozzle is provided in the center of wax brush bed 14 with its corresponding dedicated pump, while the remaining four nozzles are each separately connected to the four remaining pumps in symmetrical positions to the left and right of the center nozzle on the centerline of brush bed 14. Calling up the last loaded wax plan, entering the password and entering the main menu screen is also performed.

When the initialization and pre-load step 80 is completed, the system then waits at step 82 to detect fruit passing below camera 12 on brush bed 14. While in or before the wait step 82, edit changes may also be entered by the user. For example, the current wax plan may be changed or edited through step 88, the nature of the fruit texture may be modified at step 90 or the wax controller mode changed at step 92.

If the system determines that fruit is present at step 84, it advances to the fruit imaging processing sequence 86. Otherwise it checks to make sure the pumps are off at step 103 to avoid inefficient wax spraying when the fruit is absent, and returns to step 88. After the fruit image is processed in sequence 86, the program in turn returns to the quiescent detection step 82.

Once fruit is detected, the currently active scan line number is detected and is saved to the onboard memory chip in computer 64 at step 94. Thereafter, the next 30 scans are transferred from scan store card 60 into the memory of personal computer system 64 with the data subject to image processing.

One of the first steps in image processing is to distinguish the image of the fruit from the background of the rollers at step 96. Next, the data is processed to determine if the fruit images are touching each other, and if so, the images are modified so that the fruit is no longer in contact or is "de-touched" at step 98. If image separation were not done, it would be possible to confuse several touching fruit as a single wide fruit, thereby giving a false value for the fruit diameter and surface area with resultant over-spraying of the fruit on the conveyor.

After the fruit images have been de-touched, the fruit diameters are computed, and from that, the total surface area of the of fruit passing under camera 12 computed at step 100. It will readily be understood that, at a given instant, there will normally be a fairly large number of fruit in that total surface area, due to the substantial width of the conveyor and the closeness of packing of the fruit thereon. In effect, that calculation determines the number of fruit in the instantaneous array then within the camera's field of view, together with the surface area of each of them, yielding a total surface area of fruit in the array. Normally, it is assumed that this array is identical to the group of fruit which will then be sprayed. With the latter assumption, the spray commands can then be determined based on the fruit surface area and a wax volume proportional to the total surface area of all the fruit under the nozzle(s) and generated at step 102. Of course, differential commands can be given to each nozzle, corresponding to the corresponding fruit surface area to be passed within the range of that nozzle.

Having de-touched the fruit, the fruit diameters of individual fruit surface areas are calculated and accumulated for a total surface area count. The total surface area is proportional to the volume of the fruit under the camera and is mapped to the pump rate (i.e., spray intensity), normally differentially for each nozzle, according to a linear relationship predetermined in the wax plan. This predefined relationship depends on the values entered for the fruit texture, the maximum pump rates for the center and edge pumps, minimum pump rates for both center and edge pumps, maximum fruit rate and the minimum fruit rate.

Pumps 56 are a variable rate type of pump. A rate value is sent from computer system 64 to the pumps which is proportional to the calculated total surface area of the fruit passing under the nozzle. The higher the value, the more wax the pumps will stroke through the waxer. After a rate value has been sent to each of pumps 56, computer system 64 returns ultimately to a wait state 82 for the next available fruit or fruit array detected by the camera.

Figure 7:
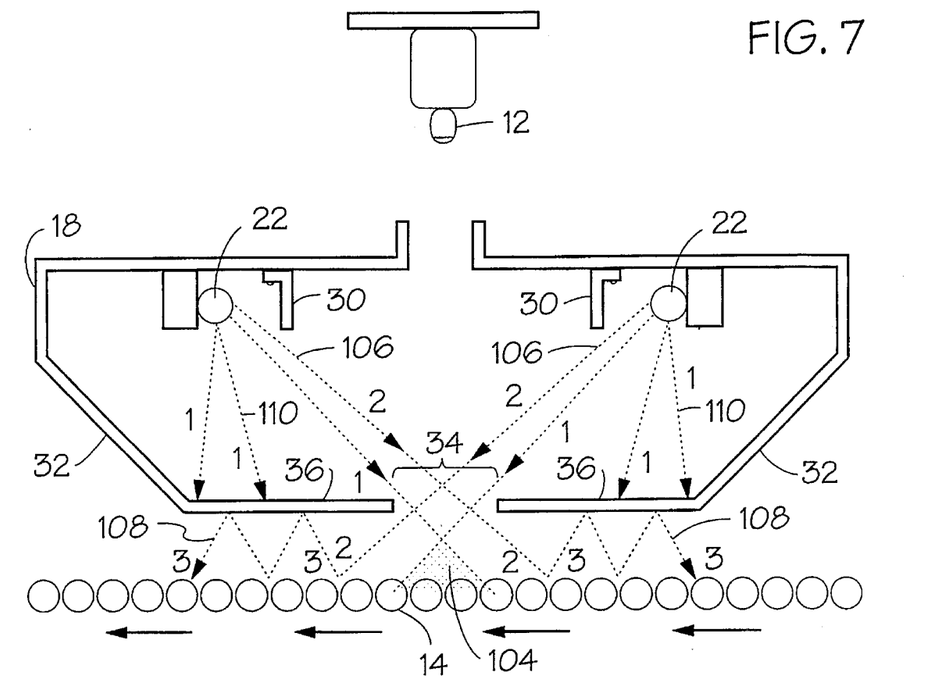
FIG. 7 is a diagrammatic side depiction of the waxer illuminator of FIGS. 1–3 illustrating the methodology of the invention with respect to establishing a background illumination when fruit is absent from the brush conveyor.

Now we shall consider the mechanics of the processing steps in greater detail. FIGS. 7 and 8 illustrate the process of separating the image of the fruit from the conveyor background reflection. When there is no fruit on the rollers of brush bed conveyor 14 (see FIG. 7), the rollers directly under the line of view of line scan camera 12 are completely hidden because light from lamps 22 is blocked from reaching camera 12 by lamp shades 30 and roller shades 36 which create a shadow area 104 across the width of brush bed conveyor 14. Creation of shadow area 104 in effect hides the rollers from camera 12. Light reaching other rollers of brush bed conveyor 14 such as on optical ray paths 106 are reflected away from camera 12 on the inner side of roller shades 36 as symbolically depicted by reflected rays 108. Light from lamps 22 which do not impinge upon camera slit 34, such as symbolically depicted by rays 110, are absorbed by the flat black non-reflecting surfaces of lower portion 32 of housing 18.

The illumination intensity of shadow area 104 with fruit absent is then used in a teach mode to provide processor 64 with an image which can be recognized at the roller background image.

When fruit 112 passes down brush bed conveyor 14 (see FIG. 8), light rays 106 normally directed through camera slit 34 will then impinge upon fruit 112 and be directly reflected into camera 12 as symbolically denoted by reflected rays 114. This creates a bright region that is easily detected by the camera sensor. Application software within personal computer system 64 detects the drastic change in light level over the shadow area 104 and thus triggers a video fruit image data capture. Both the threshold level by which data image begins to capture and the shadow level of area 104 are user-adjustable through touch screen 78.

The data system is now ready to detect the fruit and stores the data image for the fruit across the width of the conveyor line. In an ideal situation the fruit rolling down brush bed conveyor 14 would be clearly distinct and separate from each other with each fruit having easily visible detectable boundaries. However, in practice, the fruits often touch one another whether brush bed 14 is full or not. Thus, the boundaries between each of the fruit tend to blur within the pixel sensitivity of the camera and will result in falsely computed data if not corrected by the de-touch algorithm.

In the illustrated embodiment, the de-touching algorithm is implemented in a robust two-dimensional edge gradient spatial filter, more commonly known as a Sobel filter. The Sobel filter is implemented as a 3 by 3 mask filter and has the advantage of simultaneously detecting all horizontal and vertical edge information in a given image and combining the information into a final and detailed edge map of the input data image. The operation of the Sobel filter is described as follows.

First, let F(u,v) be the original image with the parameters u and v being the horizontal and vertical location of each image pixel in the two-dimensional map, respectively. Then let H(m,n) be the Sobel spatial filter mask having m by n dimensions which in the illustrated embodiment is less than or equal to 3. Finally, let the function G(u,v) be the final completed edged map of the originally input image. Thus, according to the Sobel spatial filter, the final completed edge map, G(u,v) is given as $$G(u,v)=F(u,v)*H(m,n)+F(u,v)*H*(m,n)$$

where u and v assume all the values and the full dimensional range of the image;

H* is the matrix transpose of the mask H; and the operation "*" is a spatial convolution operator.

Graphically, the operation of the Sobel filter is depicted in the simplified block diagram of FIG. 9. The Sobel operator used in the illustrated embodiment is:

$$H = \begin{matrix} -1 & -2 & -1 \\ 0 & 0 & 0 \\ 1 & 2 & 1 \end{matrix}$$

and the matrix transpose H*

$$H* = \begin{matrix} -1 & 0 & 1 \\ -2 & 0 & 2 \\ -1 & 0 & 1 \end{matrix}$$

Where H is the horizontal edge detector, since its columns add up to zero, and H* is the vertical edge detector since is rows add up to zero. The final result of both detectors when added is to form a gradient of the original image which can be sliced above a predefined threshold to form an edge map of the original image.

The final image shown in the edge map are defined by the abrupt changes in pixel intensity signifying the image transition between a roller of conveyor 14 and the edge of a fruit 112. Smoother transitions, such as touching fruit ends are greatly de-emphasized by the Sobel filter and eventually nulled by the slicer which renders the previously touching fruits as distinct pieces of fruit or images.

Given now that the fruit is de-touched in step 98 of FIG. 6, we will consider how the diameters and total surface area of each of them is computed in step 100. Camera 12 and its housing unit is positioned about 2.15 meters above rollers of conveyor 14 so that it is clearly able to view the entire width of the conveyor belt. Since the camera sensor is a line scan of 250 pixels, its sensor can resolve measurements as large as one centimeter for a 2.4 meter width or as small as 0.7 centimeter on a 1.8 meter width belt. After computer system 64 detects the presence of fruit and performs the de-touching algorithm on the resultant image, the fruit surface area step examines each individual scan line to keep track of the pixel width at the start and end point of the scan lines for each section of the fruit in the scan. As more scans are examined, eventually each fruit will have identified with respect to its image a maximum pixel width which will be associated with its diameter. This maximum pixel width is then used to compute the surface area of the fruit based on the assumption that the fruit is a sphere, namely the surface of the spherical fruit will be $\pi D^2$. D may be measured in a linear measurement or may be the product of the maximum pixel width of the scanned fruit image times the pixel resolution.

Although citrus fruit is not perfectly spherical, nevertheless, using a spherical model has been observed to provide good results. If even greater accuracy is desired, the fruit may be elliptically modeled and the surface area of the ellipse derived therefrom using convention geometric principles. In the case of elliptical model, both the maximum pixel width as well as the pixel length of the image will be determined either graphically or derived from belt speed to compute the image size in both horizontal and vertical directions.

The surface areas of each of the individual fruit are accumulated for all the fruits within the instantaneous array and displayed every second on touch screen 78. This provides the user and pump control software with a value for the total fruit-surface-area-per second seen by camera 12. In addition, it can also be determined whether the measured fruit is in the center or below one of the four lateral nozzles so that the pump stroke for the specific nozzle, usually located down-line, can be adjusted in time so that when the visually scanned sub-array of fruit reaches the nozzle, an appropriate wax application rate (i.e, intensity) for the corresponding sub-group of fruit is applied.

Imaging processing and computer system 64 is a real time continuous scanning process. The system is always looking for available fruit, computing and accumulating the fruit surface area on a scan-by-scan basis to ensure that no scans are overlooked in the process. The process is interrupted every second by the operating system to display the accumulated values for the total fruit surface area. The interruption for fruit surface area display lasts only a few milliseconds and does not effect the overall processing of the fruit, which resumes where it left off before the interruption. In this manner, the fruit may be tagged and followed between successive scanned images. In other words, the appropriate surface areas can be calculated and tagged to a specific item or array or sub-array of fruit units on the conveyor belt and used for appropriate timing and relative positioning for wax spraying down-line. In the meantime, new fruit arriving within the scanned position can be scanned anew and tagged with a different surface area for subsequent waxing without loss of any data or correlation of the surface area data for the earlier fruit.

User Interface

Figure 10:
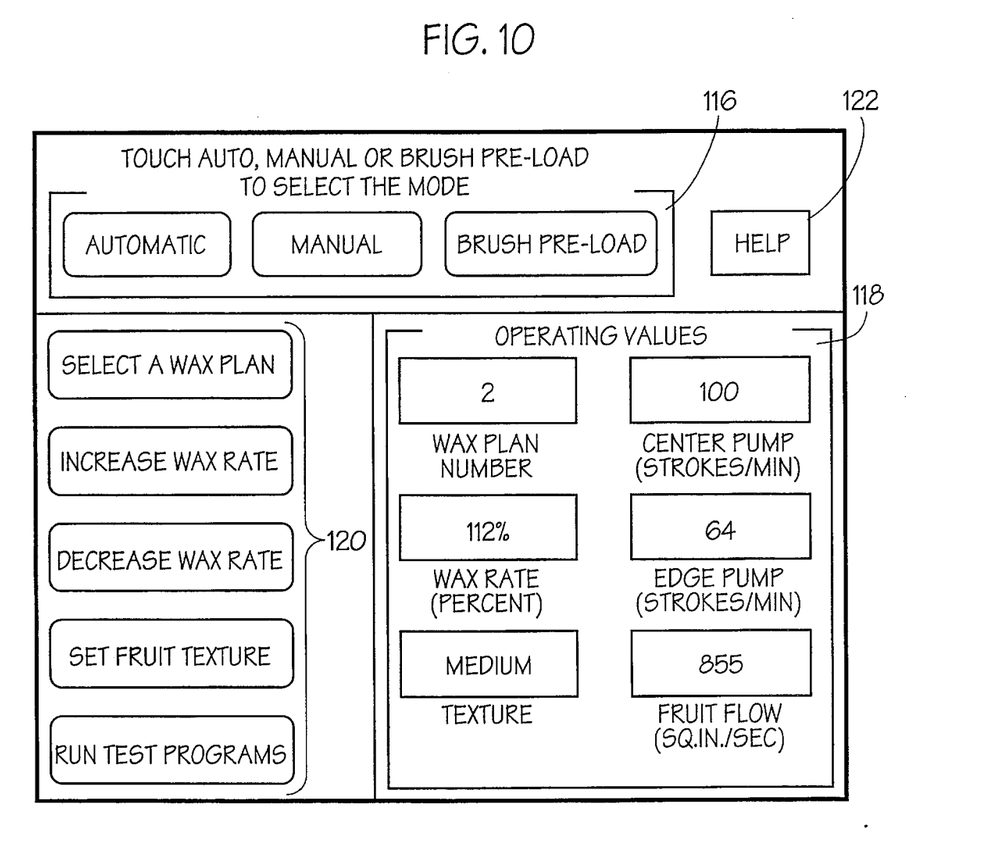
FIG. 10 is an illustration of the main menu touch screen.

The details of the operation now having been described we shall next consider its overall operation by the user. The main operating screen on touch screen 78 is depicted in FIG. 10 and is provided with automatic, manual, and brush pre-load mode buttons 116, a display area 118 that shows a current wax plan number, fruit texture, fruit flow rate and current center and edge pump rates 118, and command buttons 120 which allow the user to change the controller parameters such as fruit texture, general wax increase/decrease factor and wax plan number. A contextual help screen is called up through a help button 122.

Upon power-up, the screen of FIG. 10 displays the last settings used before shutdown, thereby avoiding the need to reenter the same parameters after every shutdown. The main screen will boot up either in a manual or automatic mode, shown by the highlighted command button 116 along the top of the display. In the automatic mode, the system processes fruit image from camera 12 to calculate the surface area per unit time and then sets the stroke rate for each pump as specified by the current wax plan factors. These values are displayed in display area 118 along with the other parameters, such as fruit texture and wax plan number.

If the system boots up in the manual mode, the system still processes the camera data to calculate the surface area per unit time, but stroke rates for each pump remain at a fixed level set by the user if there is fruit passing under the camera. If no fruit is passing under the camera, then pumps are completely shut off. The manual mode is useful for testing and as a back up in case of automatic mode failure.

The brush-preload button 116 enables the user to pre-load brushes with wax for a predefined time interval and at a given center and edge pump rate. After pre-load waxing is complete, the system reverts to its prior selected waxing mode, i.e. manual or automatic.

Whenever the user touches any of the buttons on the screen of FIG. 10, a password form will pop-up asking the user to enter a four-digit password. At this point, the user must enter his unique password. If it is valid, the system will allow the user to operate the screen. If there is no activity on the user interface screen for five minutes the system will ask the user to reenter the password. Entry of an invalid password will prevent the user from accessing any of the run screen functions.

If touch panel 78 is idle for 15 minutes or more, it fades to black, and a screen saver message rolls across the touch screen to prevent burn-in or burn-out. Simply re-touching the panel restores the previously run screen image.

Running the automatic mode is accomplished by designating the wax plan number which is to automatically control the waxing operation. In the manual mode, a manual mode display screen will replace the screen of FIG. 10, and the user will be asked in pop-up screens to increase or decrease the stroke rates per minute of the center or edge pumps as may be desired.

If the user presses the brush-preload mode, brush-preload mode to screen will be displayed and the user asked to manually set the stroke rate for the center and edge pumps as well as providing a wax pre-load time interval. The brush bed 14 will then be sprayed with wax according to the user's commands.

When in the automatic mode, a wax plan selection generation menu will be displayed in which the user and pop-up buttons will be asked to either select a valid wax plan, edit the valid wax plan or create a new wax plan. Wax plans are identified by numbers and can be sequentially selected and then entered. If the user desires to edit a wax plan, a wax plan editing creation menu is then displayed which allows the user to select center and edge pump rates for smooth, medium or rough textures of the fruit. Minimum and maximum pump and minimum and maximum fruit flow rates are provided in a matrix for the center and edge pumps for each of the three texture types, smooth, medium or rough. The K factor, the general wax rate, can also be increased or decreased at this time and the fruit texture chosen.

In addition, the user is provided with various camera test routines to calibrate and align the camera. Various optical scan patterns can be placed on the brush bed 14 beneath camera 12 to facilitate in this process and such patterns may simply comprise patterns of separated black bars printed on a sheet of paper.

Among the calibrations which can be accessed is a system configuration button. This allows the processing software to be directly accessed and fine-tuned by the user. In this situation, various parameters can be numerically set. Such parameters include the wax blast interval which is the interval where the wax pumps are run at maximum speed after a prior shut-down. This is often necessary because the pumps have been idle for a time and the wax in the pump lines travel slowly due to low pressure in the pump lines. This would ordinarily produce a very poor wax shine. The blast interval pre-charges the pump lines with wax at high pressure to compensate for the previous low pressure drop. This interval is user-adjustable for each system according to time by using a wax blast interval button.

The user may also vary the time at which the pumps are run at a minimum pump rate, such as when no fruit is passing by and they are completely shut down. After the last batch of fruit is passed under the camera, it is often not desirable to immediately turn the pumps off because there would be another batch of fruit within a few seconds of the previous batch. This interval determines how long the controller should wait for the next batch before it shuts the pumps off completely. The interval is adjusted by the user by touching a wax turn off delay.

The user can also set absolute maximum pump rates through an absolute maximum pump rate button. The scan processing threshold and image capture threshold as described above which are used to distinguish the fruit on the conveyor and the conveyor itself can be manually adjusted. A fruit waxing delay period can be adjusted to account for differences in speed between the faster relative imaging processing and the relatively slow motion of the fruit on the brush bed.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

As a first example of such a variation within the spirit and scope of the invention, the number of pumps 56 and associated nozzles may be changed to any convenient quantity, with essentially continuously changing differential spray intensity commands given to each of them, to each service the sub-group of fruit passing within their range, each of which corresponds to a detected sub-array.

Additionally, in order to reduce the distance from camera 12 to the conveyor 14—to yield a more compact device—a system of folded mirrors may be used instead of using merely the distance between camera 12 to conveyor 14 to provide the required light beam distance. Other optical devices and configurations, all well within the ability of a reasonably skilled practitioner, may also be utilized for this purpose.

Since the imaging/scanning capability of this invention generates data corresponding to the geometric parameters of each fruit, it would be rather straightforward to augment the software herein described to provide a record of the size distribution of the fruit and also to calculate size distribution, should such a need occur in the particular application.

A flowmeter might be added to the wax flow line from each pump 56, so that the flow could be continuously monitored and the flow data utilized for control or other purposes. With flowmeter information and knowledge of the number of fruit passing centerline 16 in a selected period of time, the number of fruit per liter of wax or the amount of wax used per carton of fruit could easily be calculated, yielding valuable data to packinghouse managers, who need to monitor all contributing cost elements in the fruit packing process.

The latter data could, through a local area network, be transmitted, together with other data, to a central packinghouse computer for statistical/economic purposes. The analysis of this information could provide the basis for decisions as to necessary operational changes, such as substitution of different, more efficient waxes, and the like. Such information could also be used for feedback control of valves which supply wax to the system, or which control the flow of different types of waxes for optimal, and continuously or selectively changing, blends.

It can readily be seen that these and other modifications, within the spirit and scope of the invention demonstrate the great utility and flexibility of the concept.

The following claims are, therefore, to be read to include not only the combination of elements which are literally set forth, but also all equivalent elements for performing substantially the same function in substantially the same way to obtain substantially the same result. Furthermore, the claims are to be understood to include what is specifically illustrated and described above, what is conceptually equivalent and also, as just shown, alternate embodiments incorporating the essential idea of the invention.

We claim:

1. An apparatus for applying a controlled quantity of a substance to the surface of a plurality of substantially axially-symmetric, three-dimensional objects in a two-dimensional array of said objects, each of said objects having an axis, and having variable, measurable geometric features, comprising:

Photometric means for measuring geometric features, comprising the length of the axis and the diameter across the axis, of each of said substantially axially-symmetric, three-dimensional objects in the two-dimensional array;

Control circuit means, responsive to said photometric means, for generating a command to dispose a calculated amount of the substance on each particular portion of the array in accordance with the geometric features of the objects in such particular portion, measured by said photometric means; and substance application means, responsive to said control means, for disposing said specifically calculated amount of the substance on each such particular portion of the array, whereby said substance is efficiently applied to each one of said three-dimensional objects in the two-dimensional array notwithstanding variations, among said objects, in said geometric features.

2. The apparatus of claim 1, further comprising conveyor means for transporting said two-dimensional array of objects into operative orientation with said photometric means and into operative orientation with said substance application means, wherein said photometric means comprises camera means for generating an image of said objects according to a predetermined scan procedure.

3. The apparatus of claim 2, wherein said camera means comprises means for generating a line scan image of each of said objects.

4. The apparatus of claim 2, wherein said camera means comprises a video camera.

5. The apparatus of claim 1 wherein said control circuit means comprises a computer means for receiving, from said photometric means, a signal corresponding to said measured geometric features, and said computer means computes the surface area of each of said objects from the length of the axis and the diameter across the axis thereof and generates a corresponding command signal to said substance application means for controlling application of said substance to each such particular portion of the two-dimensional array of said objects.

6. The apparatus of claim 5, wherein said photometric means comprises camera means for generating a line scan image of the two-dimensional array of said objects along a predetermined line across said conveyor means, transverse to the direction of travel of the array of said objects on said conveyor means; and said computer means correlates a selected magnitude for said measured features with said scanned line images corresponding to each of said objects on said conveyor means.

7. The apparatus of claim 1 further comprising a plurality of applicator subsystems each individually controllable by said control circuit means, each applicator subsystem adapted to apply said substance to objects on said conveyor system.

8. The apparatus of claim 7, wherein each applicator subsystem is comprised of an applicator for disposing said substance on each of said objects and a corresponding variable pump for supplying said substance to said applicator, wherein said control circuit means independently provides commands to each of said pumps to provide a corresponding selective amount of said substance to each particular area of the array of said objects on said conveyor means.

9. The apparatus of claim 1, wherein said photometric assembly detects said object at a predetermined viewing position on said conveyor system and provides a plurality of pixel line scans of each said object for a corresponding plurality of scan times.

10. The apparatus of claim 9, wherein said photometric means comprises a memory circuit for assembling said plurality of line scans into a pixel map of each of said objects passing through said viewing area on said conveyor means.

11. The apparatus of claim 10, wherein said photometric means processes said pixel map of each of said objects passing through said viewing area on said conveyor means to provide a distinct and separated pixel map for each of said objects passing through said viewing area of said conveyor means.

12. The apparatus of claim 11, where said photometric means generates said distinct and separate pixel map of each of said objects passing through said viewing area on said conveyor means by subjecting said pixel map to a Sobel filter.

13. The apparatus of claim 11, wherein said control circuit generates a maximal scan line width for each of said distinct and separate pixel maps for each of said objects passing through said viewing area on said conveyor system.

14. The apparatus of claim 13, wherein said control circuit generates a corresponding object axis length for each of said objects based on said maximal scan line width, and generates a corresponding surface area for each of said objects based on said axis length and the diameter across said object determined from said pixel map thereof.

15. The apparatus of claim 14, wherein said control circuit generates a command signal corresponding to the volume of said substance to be applied to said object according to said computed surface area and at least one other user input parameter corresponding to said object.

16. An apparatus for applying a controlled quantity of a substance to the surfaces of a plurality of substantially axially-symmetric, three-dimensional objects in a two-dimensional array of said objects, each of said objects having an axis, comprising:

photometric means for measuring the quantity of objects within the array of said objects and for measuring geometric features of each of said objects in said array, said features comprising the length of the axis and the diameter across the axis thereof;

control circuit means, responsive to said photometric means, for generating a command to dispose a calculated application intensity of the substance on those of said objects in a particular portion of said array, in accordance with the geometric features of said objects and the quantity thereof in the particular portion of said array measured by said photometric means; and substance application means, responsive to said control means, for disposing said specifically calculated application intensity of the substance on said particular portion of said array of objects, whereby said substance is efficiently applied to said objects notwithstanding variations, among the objects measured by said photometric means, in said geometric features and quantity.

17. The apparatus of claim 16, further comprising conveyor means for transporting the array of said objects into operative orientation with said photometric means and into operative orientation with said substance application means, wherein said photometric means comprises camera means for generating an image of said objects according to a predetermined scan procedure.

18. The apparatus of claim 17, wherein said camera means comprises means for generating a line scan image of each of said objects.

19. The apparatus of claim 17, wherein said camera means comprises a video camera.

20. The apparatus of claim 16, wherein said control circuit means comprises computer means for receiving, from said photometric means, a signal corresponding to said measured geometric features in respect to each of said objects in the array thereof being viewed, and said computer means computes the quantity of said objects in said array and the surface area of each of said objects in said array and generates a corresponding command signal to said substance application means for controlling application of said substance to a particular portion of said array of said objects.

21. The apparatus of claim 20, wherein said photometric means comprises camera means for generating a line scan image of the two-dimensional array of said objects along a predetermined line across said conveyor means, transverse to the direction of travel of the array of said objects on said conveyor means; and said computer means correlates a selected magnitude for said measured features with one of said scanned line images corresponding to each of said objects on said conveyor means.

22. The apparatus of claim 16, further comprising a plurality of applicator subsystems each individually controllable by said control circuit means, each applicator subsystem adapted to apply said substance to said objects on said conveyor system.

23. The apparatus of claim 22, wherein each applicator subsystem is comprised of an applicator for disposing said substance on said objects and a corresponding variable pump for supplying said substance to said applicator, wherein said control circuit means independently provides commands to each of said pumps to provide a corresponding selective application intensity of said substance to said particular portion of said array of said objects on said conveyor means.

24. The apparatus of claim 16, wherein said photometric assembly detects said array of objects at a predetermined viewing position on said conveyor means and provides a plurality of pixel line scans of each said object in said array for a corresponding plurality of scan times.

25. The apparatus of claim 24, wherein said photometric means comprises a memory circuit for assembling said plurality of line scans into a pixel map of each of said objects in said array passing through said viewing area on said conveyor means.

26. The apparatus of claim 25, wherein said photometric means processes said pixel map of each of said objects in said array to provide a distinct and separated pixel map for each of said objects in said array.

27. The apparatus of claim 26, wherein said photometric means generates said distinct and separate pixel map of each of said objects in said array by subjecting said pixel map to a Sobel filter.

28. The apparatus of claim 27, wherein said control circuit generates a maximal scan line width for each of said distinct and separate pixel maps for each of said objects in said array.

29. The apparatus of claim 28, wherein said control circuit generates a corresponding object surface area for each object in said array based on said maximal scan line width according to an assumed geometric configuration and orientation of said objects in said viewing area on said conveyor means.

30. The apparatus of claim 29, wherein said control circuit generates a command signal corresponding to the intensity of said substance to be applied to the objects in said group according to said computed surface area and at least one other user input parameter corresponding to each object in said array.

31. The apparatus of claim 16, wherein said control circuit means assumes that the constitution of said particular portion of said array of objects remains substantially uniform during a prescribed passage of time.

32. A controller for controlling the coating of substantially axially-symmetric objects having varying geometric measurable features, such as fruit with a substantially liquid substance in a conveyor system comprising:

a camera;

a housing for supporting and orienting said camera with respect to said conveyor system and for defining an optical field of view;

a memory circuit coupled to said camera for assembling a pixel map of video images of each of said objects on said conveyor system passing through said field of view;

a computer circuit for separately determining geometric features of each of said separately detected objects from each of said corresponding images and generating a command signal for each of said objects corresponding to said respective images according to said geometric features associated therewith, said geometric features comprising the length of the axis and the diameter across the axis thereof;

at least one variable substance applicator for disposing said substance on said objects detected while passing through said field of view on said conveyor system, the amount of substance being controlled in response to the geometric features of said objects as determined by said computer circuit whereby said substance is efficiently and optimally applied to each of said objects.

33. The apparatus of claim 32, wherein said camera comprises a line scan camera providing spherical data to said memory circuit and wherein said length of the axis of said object corresponds to a maximal line scan width associated with said image of said object.

34. The apparatus of claim 32, wherein said camera comprises a video camera.

35. The apparatus of claim 32, wherein said substance applicator comprises a variable stroke pump coupled to a substance nozzle, the stroke of said pump being controlled according to said command signal in response to computed surface area of said object positioned beneath said substance nozzle for application of said substance thereto.

36. The substance controller of claim 32, further comprising a plurality of substance applicators, each of said substance applicators being independently controlled by said computer circuit to apply variable amounts of said substance to corresponding ones of said objects detected while passing through said field of view of said conveyor system.

37. The substance controller of claim 32 wherein said computer circuit processes said pixel maps of said objects within said viewing area of said conveyor system to generate a disconnected image of each of said objects.

38. The substance controller of claim 32, wherein said computer circuit is user-adjustable to vary detection and object image separation thresholds corresponding to said pixel map of said images of said objects within said viewing area of said conveyor system.

39. The substance controller of claim 32, wherein said substance to be applied comprises a wax.

* * * * *